United States Patent
Geiser et al.

(10) Patent No.: US 10,451,159 B2
(45) Date of Patent: Oct. 22, 2019

(54) SWITCHABLE ONE-WAY CLUTCH

(71) Applicant: SCHAEFFLER TECHNOLOGIES AG & CO. KG, Herzogenaurach (DE)

(72) Inventors: Jordan Geiser, Dalton, OH (US); Michael Hodge, Creston, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 184 days.

(21) Appl. No.: 15/662,920

(22) Filed: Jul. 28, 2017

(65) Prior Publication Data
US 2019/0032760 A1    Jan. 31, 2019

(51) Int. Cl.
| F16D 41/08 | (2006.01) |
| F16H 3/10 | (2006.01) |
| F16H 48/30 | (2012.01) |
| F16D 41/067 | (2006.01) |
| F16H 48/19 | (2012.01) |
| F16D 47/04 | (2006.01) |

(Continued)

(52) U.S. Cl.
CPC ........... *F16H 48/19* (2013.01); *F16D 41/067* (2013.01); *F16D 41/088* (2013.01); *F16H 3/10* (2013.01); *F16H 48/30* (2013.01); *F16D 25/086* (2013.01); *F16D 41/04* (2013.01); *F16D 47/04* (2013.01)

(58) Field of Classification Search
CPC .... F16D 41/04; F16D 41/0646; F16D 41/066; F16D 41/067; F16D 41/08; F16D 41/086; F16D 41/088; F16D 47/04; F16D 13/38; F16D 13/40; F16D 25/06; F16D 25/088; F16H 48/19
See application file for complete search history.

(56) References Cited

U.S. PATENT DOCUMENTS

| 5,971,123 A | 10/1999 | Ochab et al. |
| RE38,012 E | 3/2003 | Ochab et al. |

(Continued)

FOREIGN PATENT DOCUMENTS

| WO | 0240891 A2 | 5/2002 |
| WO | 2002040891 A3 | 5/2002 |

(Continued)

OTHER PUBLICATIONS

International Search Report and Written Opinion for International Application No. PCT/US2018/037839 dated Sep. 27, 2018.

*Primary Examiner* — Jacob S. Scott
*Assistant Examiner* — Lori Wu
(74) *Attorney, Agent, or Firm* — Brooks Kushman P.C.

(57) ABSTRACT

A switchable one-way clutch is able to switch between operating as a one-way clutch and a clutch that locks in both directions. The clutch includes an inner race, and an outer race that includes an inner surface with a plurality of ramped profiles. A control plate is located radially outward from the inner race and moveable in an axial direction relative to the outer race. A plurality of rollers are contactable with the outer and inner races. A roller cage is configured to position and contain the plurality of rollers. A hydraulic piston is coupled to an actuator arm, such that movement of the piston along the axis moves the actuator arm along the axis. To switch and engage the clutch such that rotation is locked in both directions, the piston and actuator arm move axially to hold the control plate and attached roller cage against rotation.

17 Claims, 5 Drawing Sheets

(51) Int. Cl.
*F16D 25/08* (2006.01)
*F16D 41/04* (2006.01)

(56) References Cited

U.S. PATENT DOCUMENTS

| | | |
|---|---|---|
| 6,622,837 B2 | 9/2003 | Ochab et al. |
| 6,629,590 B2 | 10/2003 | Ochab et al. |
| 6,722,484 B2 | 4/2004 | Ochab et al. |
| 8,312,792 B1 * | 11/2012 | Kochidomari ......... F16D 27/10 411/113 |
| 8,840,514 B1 | 9/2014 | Knickerbocker et al. |
| 8,857,294 B2 | 10/2014 | Brewer et al. |
| 8,857,589 B2 | 10/2014 | Heath et al. |
| 8,919,513 B2 | 12/2014 | Heath et al. |
| 9,022,195 B2 | 5/2015 | Heath et al. |
| 9,360,059 B2 | 6/2016 | Palmer et al. |
| 2002/0125095 A1 | 9/2002 | Ochab et al. |
| 2002/0125097 A1 | 9/2002 | Ochab et al. |
| 2003/0019708 A1 | 1/2003 | Goto et al. |
| 2003/0089570 A1 | 5/2003 | Ochab et al. |
| 2004/0110594 A1 | 6/2004 | Goto |
| 2005/0236246 A1 | 10/2005 | Joki |
| 2010/0140041 A1 | 6/2010 | Wittkopp et al. |
| 2010/0314213 A1 | 12/2010 | Joki |
| 2012/0052686 A1 | 3/2012 | Liu et al. |
| 2013/0099886 A1 | 4/2013 | Yan et al. |
| 2013/0112520 A1 | 5/2013 | Heath et al. |
| 2013/0134006 A1 | 5/2013 | Heath et al. |
| 2014/0274530 A1 | 9/2014 | Knickerbocker et al. |
| 2015/0159743 A1 | 6/2015 | Palmer et al. |
| 2017/0045099 A1 | 2/2017 | Peet |

FOREIGN PATENT DOCUMENTS

| | | |
|---|---|---|
| WO | 2004031597 A1 | 4/2004 |
| WO | 2013082168 A1 | 6/2013 |
| WO | 2014143090 A1 | 9/2014 |
| WO | 2014159651 A1 | 10/2014 |

* cited by examiner

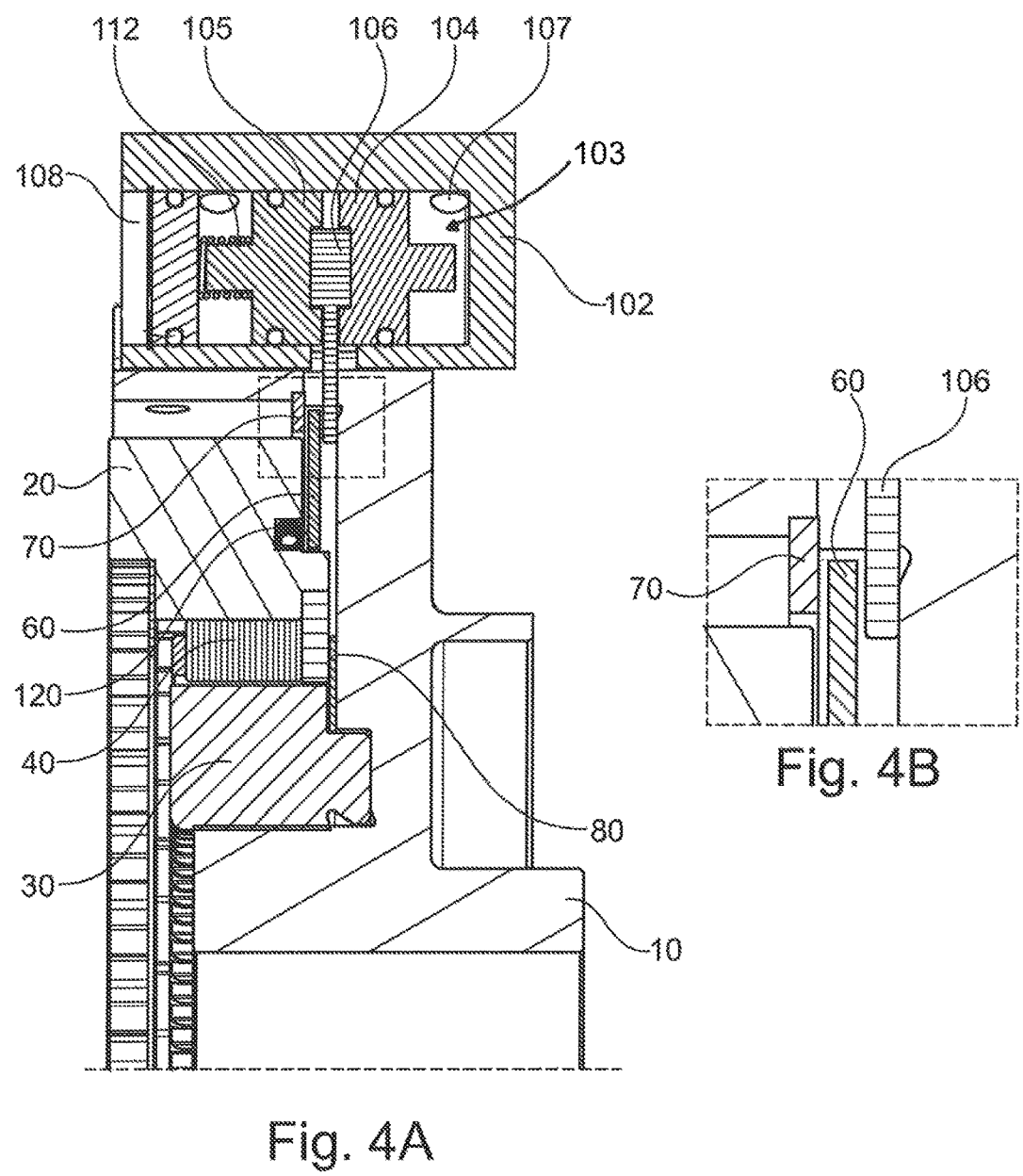

SWITCHABLE ONE-WAY CLUTCH

TECHNICAL FIELD

The present disclosure relates generally to a one-way clutch, and more specifically to a switchable one-way clutch.

BACKGROUND

One-way clutches are known, particularly in vehicle transmission settings. One-way clutches enable torque to transmit in one rotational direction while inhibiting torque from transmitting in the other rotational direction by disengaging or freewheeling. Switchable one-way clutches are also known in which the clutch can selectively be locked in one direction, both directions, or neither direction. One example of a switchable one-way clutch is disclosed in U.S. Patent Application Publication No. 2017/0045099.

SUMMARY

According to one embodiment, a switchable one-way clutch includes an outer race including an inner surface with a plurality of ramped profiles. The clutch also includes an inner race, and a control plate located radially outward from the inner race and moveable in an axial direction relative to the outer race. A plurality of rollers are contactable with the outer race and the inner race. A roller cage is configured to position and contain the plurality of rollers. The roller cage is fixed to rotate with the control plate. An actuator assembly has a piston slidable along an axis and an actuator arm coupled to the piston, wherein movement of the piston along the axis moves the actuator arm along the axis. The switchable one-way clutch is switchable between a first mode in which the piston and actuator arm are in a first axial position and the control plate is free to rotate, and a second mode in which the piston and actuator arm are in a second axial position to hold the control plate and attached roller cage against rotation.

In another embodiment, a switchable one-way clutch includes a first race, a second race concentric with the first race, and a roller cage assembly that has a plurality of rollers located radially between the first race and the second race. An actuator assembly has a piston and an actuator arm that is moveable in an axial direction via hydraulic fluid. A control plate is coupled to the roller cage assembly. The control plate is configured to move along the axial direction relative to the first race, the second race, and the roller cage assembly due to hydraulically-activated movement of the piston to selectively lock the first race with the second race.

In yet another embodiment, a switchable one-way clutch includes an inner race, and an outer race that has an outer surface and an inner surface with a plurality of ramped surface features. A roller cage assembly has a plurality of rollers between the inner race and the ramped surface features of the outer race to selectively enable torque to transmit when rotating in a first rotational direction and not transmit when rotating in a second rotational direction. A piston is selectively moveable via hydraulic fluid. Movement of the piston in a first axial direction rotationally locks the roller cage assembly to inhibit rotational movement of the outer race, and movement of the piston in a second axial direction rotationally unlocks the roller cage to enable rotational movement of the outer race.

BRIEF DESCRIPTION OF THE DRAWINGS

FIG. 4A is a cross-sectional view of the switchable one-way clutch of FIG. 1 in an unlocked mode or one-way clutch (OWC) mode, according to one embodiment.

FIG. 4B is an enlarged view of a portion of FIG. 4A.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In various embodiments described below, a switchable roller one way clutch is disclosed. The switchable roller one way clutch is also referred to interchangeably herein as a selectable roller one-way clutch, a bi-directional roller one-way clutch, switchable one-way clutch, or simply as 'one-way clutch', 'OWC', or 'clutch'. In an example embodiment, the switchable one-way clutch includes a hydraulic piston assembly that moves a control plate to vary the switchable one-way clutch between two states: (1) the 'neutral' state wherein the clutch is locked in one direction (e.g., clockwise) and free in the opposite direction (e.g., counter clockwise); and (2) the 'active' state wherein the clutch is locked in one direction (e.g., clockwise) and also locked in the opposite direction (e.g., counter clockwise).

Figure 1:
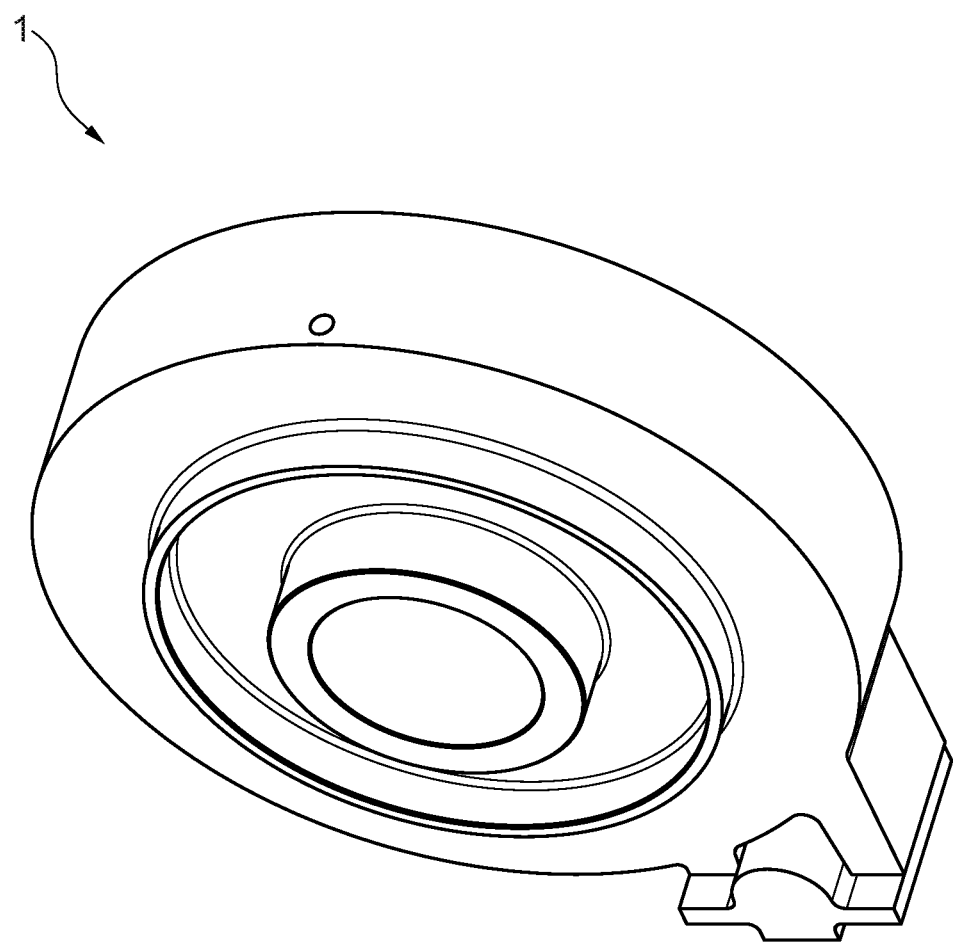
FIG. 1 is a front bottom perspective view of a switchable one-way clutch, according to one embodiment.
Figure 2:
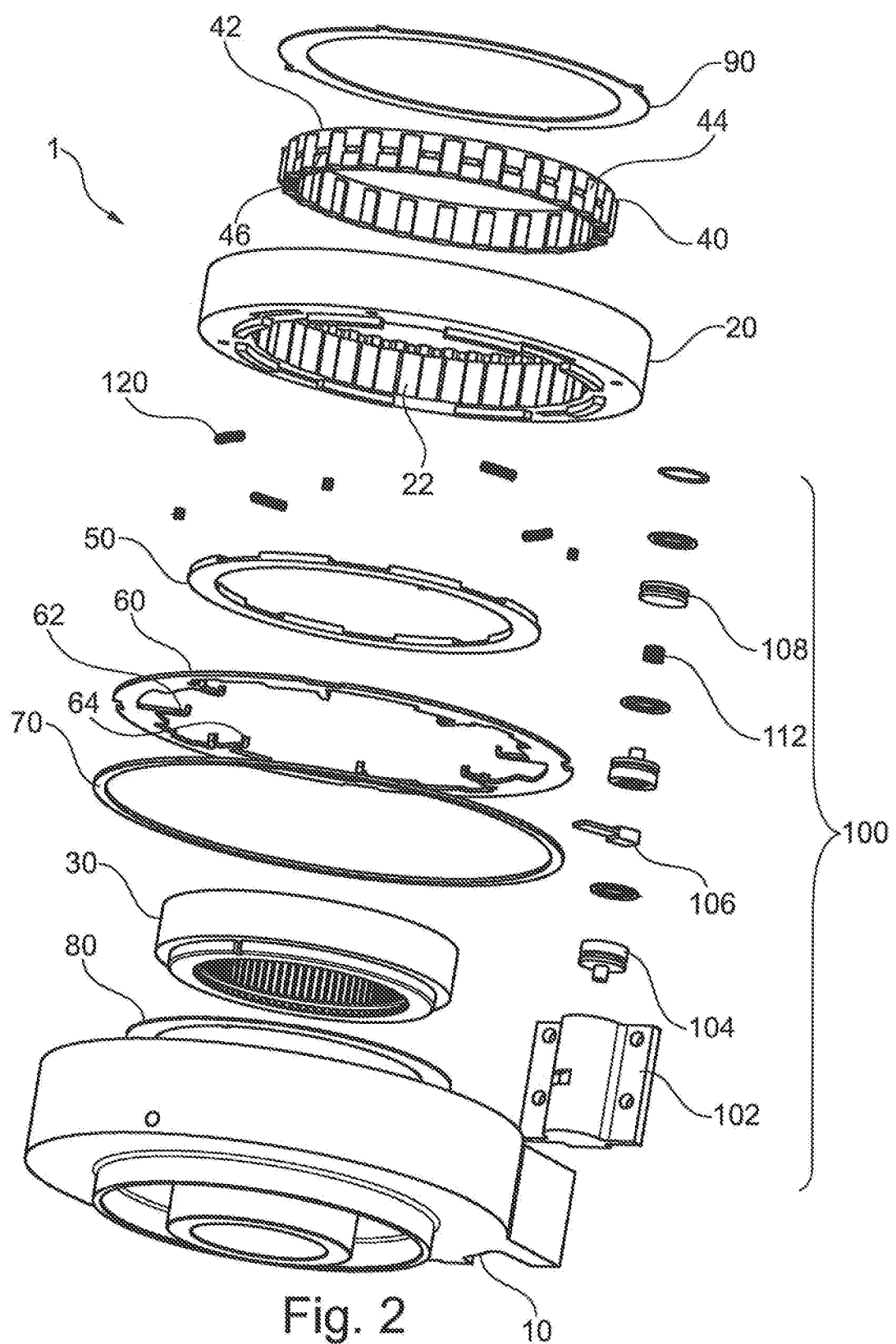
FIG. 2 is a first exploded perspective view of the switchable one-way clutch of FIG. 1, according to one embodiment.
Figure 3:
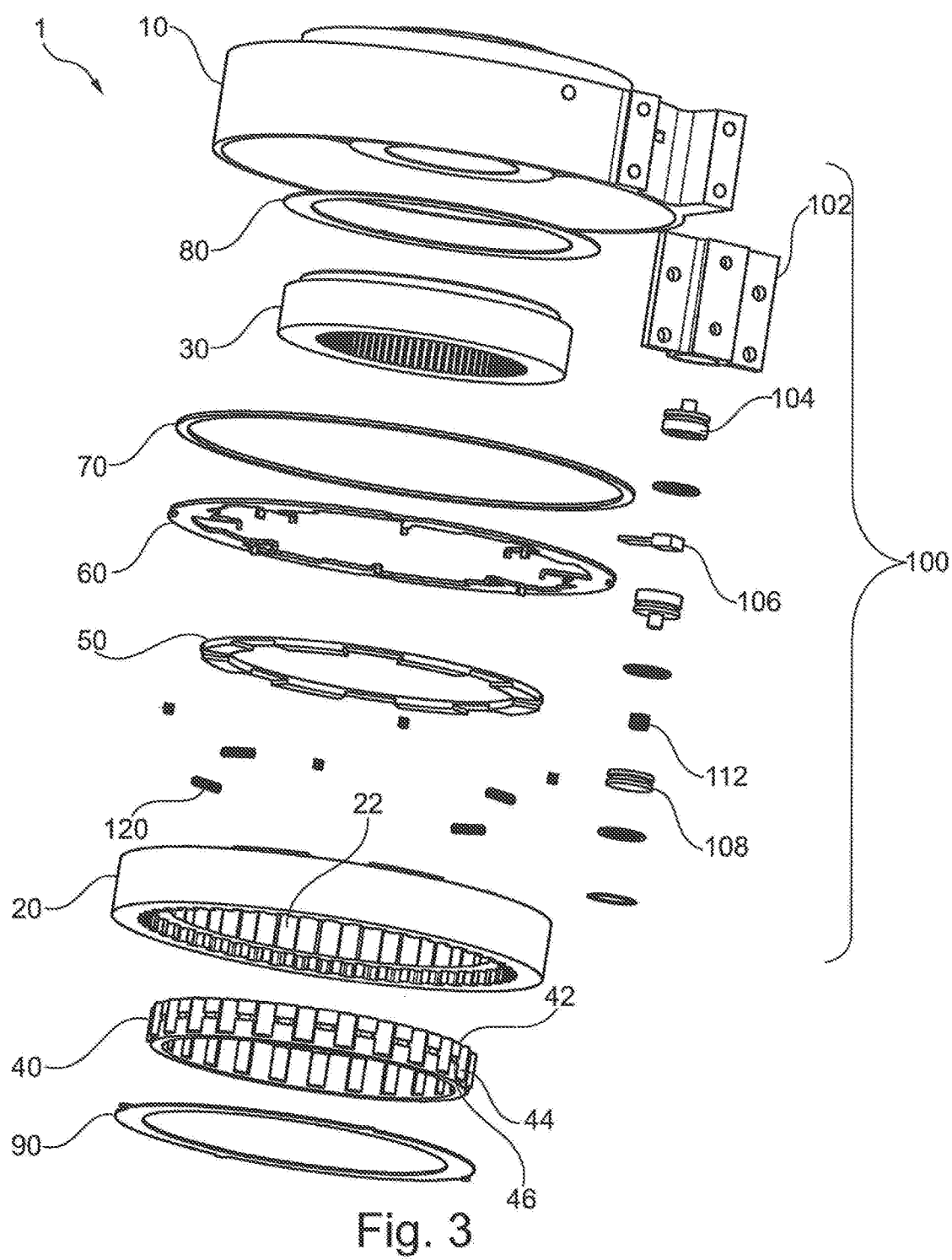
FIG. 3 is a second exploded perspective view of the switchable one-way clutch of FIG. 1, according to one embodiment.
Figures 5A, 5B:
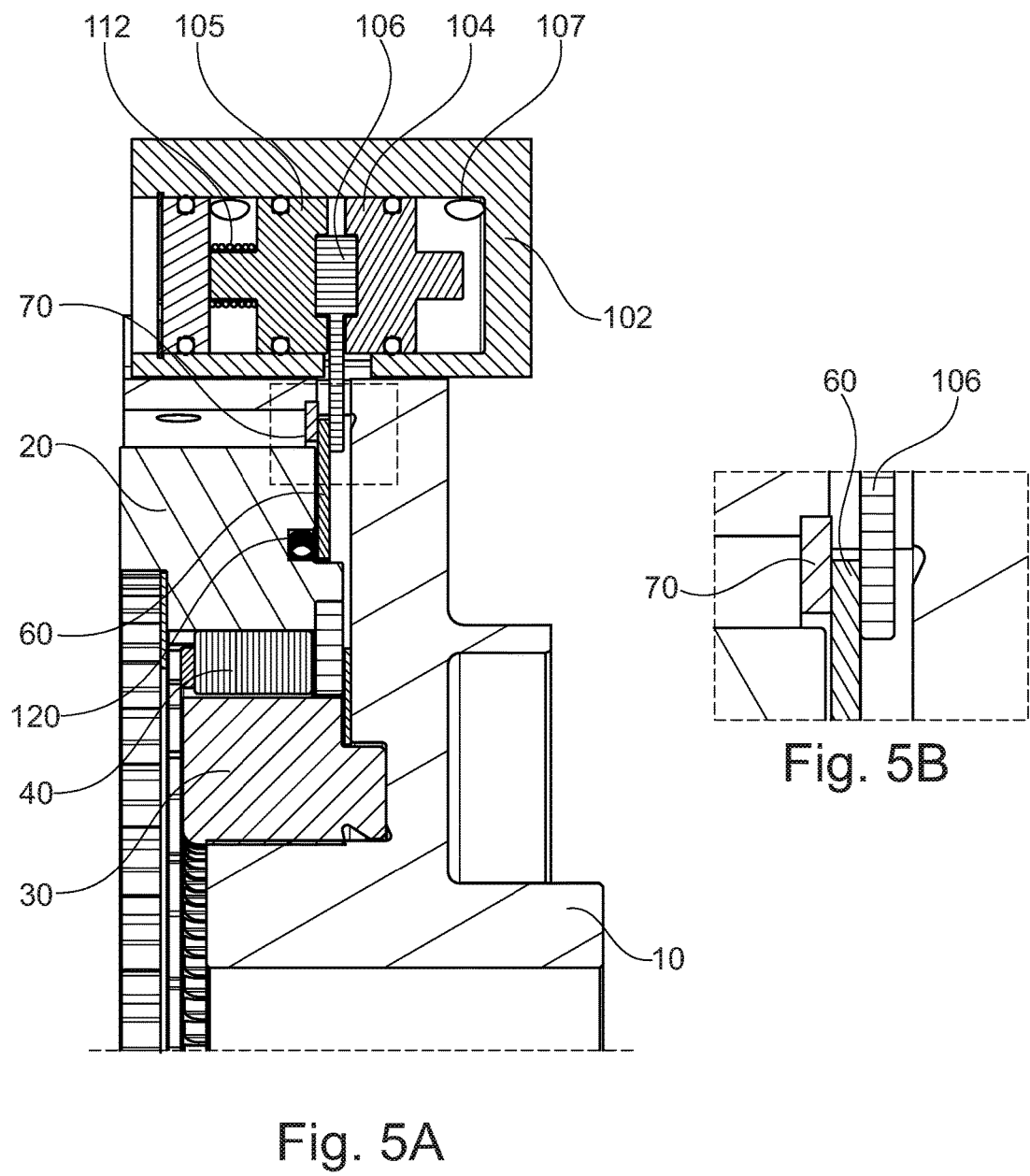
FIG. 5A is a cross-sectional view of the switchable one-way clutch of FIG. 1 in a locked mode, according to one embodiment.
FIG. 5B is an enlarged view of a portion of FIG. 5A.

Reference will now be made to the Figures in which FIG. 1 shows a perspective view of a switchable one-way clutch 1. FIGS. 2-3 show exploded perspective views of the clutch assembly 1 and its various parts. FIGS. 4A-4B show cross-sectional views of the clutch assembly 1 in an unlocked or one-way-clutch (OWC) mode, and FIGS. 5A-5B show the same cross-sectional view of the clutch 1 but in a locked mode. As will be described below, in the locked mode, one or more hydraulically-activated pistons 104, 105 causes an actuator arm 106 to move axially, which frictionally holds a control plate 60 against rotation. This causes an attached roller cage assembly 40 with rollers 44 to also remain held against rotation. This locks the outer ring 20 with rollers 44 of the held roller cage assembly 40 in either rotational direction, allowing the assembly to act as a clutch locking in two directions.

Referring to the Figures, a switchable one-way clutch 1 is illustrated. The switchable one-way clutch 1 or clutch assembly includes a housing 10 that can be locked in place or fixedly installed onto a transmission housing of a vehicle. An outer race, or outer ring, 20 is the driving, rotating component for the switchable one-way clutch 1. The outer ring 20 has an outer surface and an opposing inner surface that has an inner profile with a plurality of ramped surfaces 22. The ramped surfaces 22 are valley-shaped in that they contain a plurality of valleys and peaks. An inner race, or inner ring, 30 can be locked or fixed with respect to the housing 10. The inner ring 30 has an outer surface facing radially outward and an opposing inner surface facing radially inward. In its default position, the clutch 1 acts as a one-way clutch, locking in one rotational direction and freewheeling in the other rotational direction.

The clutch 1 is able to act as a one-way clutch due to a roller cage assembly 40 having a roller cage 42 and a plurality of roller elements, or rollers, 44 contained by the cage 42. The cage 42 is provided to position and locate the rollers 44. That is, the cage includes pockets for locating the rollers 44 so that they are spaced apart in a circumferential direction and can be rotated together relative to the inner and outer races while rotating in their respective pocket. The cage assembly 40 may include springs 46 to aid in positioning the rollers in the pockets. The rollers 44 are contactable to engageable with the inner race 30 as well as the ramped surfaces 22 of the outer ring 20 depending on an operating state of the clutch 1. That is, during some operating states, the rollers may contact only one or both of the inner and outer races, or they may contact neither the outer race nor the inner race. Examples of operation of the rollers with the inner and outer races is disclosed in commonly-assigned U.S. Provisional Applications 62/452,475 filed Jan. 31, 2017, and 62/459,015 filed Feb. 14, 2017, which are hereby incorporated by reference as if set forth fully herein.

The clutch 1 described above can operate as a one-way clutch in that rotation is permitted in one rotational direction but not another rotational direction. The switchable one-way clutch 1 described herein can also be switched so that it acts as a clutch locking in both rotational directions. Further description of this ability to switch between a OWC-mode and a mode in which the clutch locks in two directions is provided below.

A control plate 60 can be provided to selectively lock and unlock the clutch 1 to switch between operating modes. In one embodiment, the control plate 60 is fixed with respect to the roller cage assembly 40 such that they rotate together. The control plate is provided with a first set of one or more notches (e.g., teeth or arms) 62 that extend radially inward, that also have an axially-extending tip. The notches 62 are arranged circumferentially about an inner wall of the control plate in spaced relation from one another. The axially-extending tips of the notches are received within corresponding receptacles in an axially-facing surface of the roller cage assembly 40 to lock the control plate 60 with the roller cage assembly 40. That is, the control plate and the roller cage are fixed to one another with regards to rotation about the central axis. The control plate 60 is also provided with a second set of one or more notches (e.g., teeth or arms) 64 that extend radially inward and that also have axially-extending tips. The second set of notches 64 are arranged in alternating fashion with the first set of notches 62. The tips of the notches 64 are configured to be received within corresponding receptacles or surface features on an axial surface of the outer ring 20 to limit rotation of the outer ring 20 with respect to the control plate when in the locked mode.

In one embodiment, a bushing 50 is pushed into the outer ring 20. The bushing 50 can center the outer ring 20 and the inner ring 30 and retain the control plate 60. The control plate 60 is positioned between the outer ring 20 and the bushing 50. In another embodiment, the bushing 50 is not provided. As will be described below, the control plate 60 is used to control the position and operation of the roller cage assembly 40. The control plate 60 is pinched between a control arm, or actuator arm, 106 (described below) and a snap ring 70, and is held in place due to pressure from the actuator arm 106 in the locked mode.

The clutch 1 may also include an inner retaining ring 80 and an outer retaining ring 90. The inner retaining ring is housed between the housing 10 and the bushing 50. The inner retaining ring 80 inhibits the housing 10 and bushing 50 from contacting one another, maintaining a spaced relationship between the housing 10 and bushing 50. The outer retaining ring 90 retains the roller cage assembly 40 inside the outer ring 20.

An actuator assembly 100 is assembled to or part of the clutch 1. The actuator assembly 100 sits radially outboard of the housing 10. The actuator assembly 100 includes an actuator housing 102 that defines a piston chamber 103 therein. Within the piston chamber sits a pair of opposing pistons 104, 105. The pistons are configured to and capable of sliding axially within the chamber 103. While the embodiment shown in these Figures shows two pistons 104, 105, it is contemplated that alternatively only one piston can be utilized according to a routine redesign of the actuator assembly 100.

Between the pistons 104, 105 and connected thereto is an actuator arm 106. Axial movement of the pistons 104, 105 causes a corresponding axial movement of the actuator arm 106. FIGS. 4A-4B show the pistons 104, 105 and actuator arm 106 in a first position, allowing the clutch to operate in an unlocked mode or OWC mode in which rotation is inhibited in one rotational direction but allowed in the other rotational direction. FIGS. 5A-5B show the pistons 104, 105 and actuator arm 106 in a second position, causing the clutch 1 to operate in a locked mode in which rotation is inhibited in both rotational directions. The structure that allows the clutch 1 to switchably alter between modes is described below.

The clutch 1 is initially shown in its unlocked mode or OWC mode in FIGS. 4A-4B. In this mode, the actuator arm 106 is spaced from the control plate 60. An inlet 107 is defined within the chamber 103. The inlet 107 serves as an inlet for hydraulic fluid, such as transmission fluid. A cap 108 is also provided to seal or contain the fluid within the chamber 103. To move the pistons 104, 105, and thus transition into the locked mode, hydraulic fluid enters the inlet 107 under pressure, causing the piston 104 to move axially (e.g., to the left in the view taken in FIG. 4A). This causes the actuator arm 106 and other piston 105 to move axially (e.g., to the left) along with the piston 104. When the actuator arm 106 is moved into position due to hydraulic pressure, the radially-inward extending portion of the actuator arm 106 is pressed against the control plate 60. The control plate 60 is thus also forced axially (e.g., to the left) until the control plate 60 is frictionally held or pinched between the actuator arm 106 and a snap ring 70. The snap ring 70 acts as a backing plate when the actuator arm applies a force onto the control plate 60. In one embodiment, the snap ring 70 does not rotate about the central axis. With the control plate 60 being held against rotation by the actuator arm 106, the connected roller cage assembly 40 is thereby also held against rotation. This allows the clutch 1 to be in a locked mode. As shown in FIG. 5B, a slight gap remains axially between the control plate 60 and the outer ring 20, allowing the outer ring 20 to rotate about the central axis with respect to the control plate 60. However, in this locked mode, the outer ring 20 can only rotate a few degrees (e.g., between one and five degrees), until the rollers 44 roll up the ramped surfaces 22 of the outer ring 20. The outer ring 20 is therefore constrained by the held roller cage, such that the clutch 1 now operates as a locked one-way clutch, locking in both rotational directions.

A spring 112 is provided on the piston 105 to return or bias the pistons 104, 105 and actuator arm 106 axially back to an unlocked mode (e.g., to the right in the view taken in FIG. 4A). Thus, when the hydraulic fluid exits the actuator assembly 100 (either through inlet 107 or through some other outlet, such as the outlet in the piston chamber by the piston 105), the spring presses the piston 105 back to its position shown in FIGS. 4A-4B, which causes the actuator arm 106 to disengage from the control plate 60. This allows the control plate 60 to disengage from the snap ring 70. The control plate 60 and roller cage assembly 40 are thereby enabled to rotate about the central axis. The outer ring 20 is thereby unlocked form the rollers 44 in at least one rotational direction, and the clutch 1 can return to operating as a one-way clutch. Another spring 120 may be provided in the outer ring 20 to bias the control plate 60, and therefore the roller cage assembly 40, in one rotational direction about the axis (e.g., in the locked direction). When the clutch is off in the unlocked mode, the spring 120 biases the control plate 60 such that the clutch operates as a one-way clutch.

In short, the present disclosure provides a switchable clutch with a hydraulically-actuated actuator assembly. Hydraulic pressure, when commanded to do so, can enter the hydraulic chamber, causing one or more pistons to move laterally. This causes the actuator arm to also move axially. The actuator arm has a radially-extending portion that contacts the control plate when the actuator arm is pressurized to move axially. This causes the control plate to be held against rotation by the actuator arm. Being held against rotation, the control plate causes the roller cage to be held against rotation. The outer ring is therefore also constrained such that the outer ring can only rotate a few degrees until the rollers have rolled up the ramped surfaces of the outer ring. The outer ring is therefore constrained by the rollers of the roller cage assembly when rotated in either direction, allowing the clutch assembly to act as a clutch locking in two directions. To unlock the clutch, the hydraulic pressure can be removed from the chamber, allowing springs to bias the control plate out of engagement and therefore allowing the control plate, roller cage, and outer ring to rotate in one direction.

Another alternative embodiment (not illustrated) is contemplated in which the outer race is fixed to the housing and the inner race is the driving member for the clutch. In that embodiment, the inner race has the ramped surfaces on its outer profile, and the actuator arm forces the control plate into engagement with the inner race to lock the roller cage assembly and lock the clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A switchable one-way clutch comprising:
an outer race including an inner surface with a plurality of ramped profiles;
an inner race;
a control plate located radially outward from the inner race and moveable in an axial direction relative to the outer race;
a plurality of rollers contactable with the outer race and the inner race;
a roller cage configured to position and contain the plurality of rollers, the roller cage being fixed to rotate with the control plate; and
an actuator assembly having an actuator arm slidable along an axis;
wherein the switchable one-way clutch is switchable between a first mode in which the actuator arm is in a first axial position and the control plate is free to rotate, and a second mode in which the actuator arm is in a second axial position holding the control plate and attached roller cage against rotation;
wherein the actuator assembly includes a piston coupled to the actuator arm, and an inlet for receiving hydraulic fluid configured to, when pressurized, slide the piston along the axis, and wherein the piston is a first piston and the actuator assembly includes a second piston, and the actuator arm is contained between the first and second pistons.

2. The switchable one-way clutch of claim 1, wherein in the first mode the inner race and outer race are locked in a first rotational direction, and in the second mode the inner race and outer race are locked in the first rotational direction and a second rotational direction.

3. The switchable one-way clutch of claim 1, wherein the control plate includes a plurality of notches extending radially inward therefrom that are configured to engage with corresponding surface features of the roller cage to fix the control plate with the roller cage.

4. The switchable one-way clutch of claim 1, wherein when in the first mode, the outer race is constrained to rotate via the rollers rolling along the ramped profiles.

5. The switchable one-way clutch of claim 1, wherein the first piston is spring-biased to disengage the actuator arm from the control plate in absence of hydraulic pressure.

6. The switchable one-way clutch of claim 1, further comprising a snap ring disposed about the outer race, wherein in the second mode the control plate is frictionally held between the actuator arm and the snap ring.

7. A switchable one-way clutch comprising:
a first race;
a second race concentric with the first race;

a roller cage assembly having a plurality of rollers located radially between the first race and the second race;

an actuator assembly having an actuator arm moveable in an axial direction; and a control plate coupled to the roller cage assembly, wherein the control plate is configured to move along the axial direction relative to the first race, the second race, and the roller cage assembly due to axial movement of the actuator arm to selectively lock the first race with the second race; and a ring disposed about and fixed relative to the first race, wherein the actuator arm is configured to move the control plate between a first position in which the control plate is axially spaced from the ring and a second position in which the control plate is frictionally engaged between the ring and the actuator arm.

8. The switchable one-way clutch of claim 7, wherein the actuator arm is configured to move the control plate between the first position in which the control plate is axially spaced from an axial surface of the first race by a first distance, the second position in which the control plate is held against rotation by the actuator arm and is axially spaced from the axial surface by a second distance less than the first distance.

9. The switchable one-way clutch of claim 7, wherein the first race is an outer race and the second race is an inner race disposed radially inward from the inner race.

10. The switchable one-way clutch of claim 7, wherein the actuator assembly includes a piston coupled to the actuator arm and moveable in the axial direction via hydraulic fluid.

11. The switchable one-way clutch of claim 10, wherein the piston is a first piston and the actuator assembly includes a second piston, and wherein the actuator arm is held axially between the first piston and the second piston.

12. The switchable one-way clutch of claim 7, wherein the actuator assembly is disposed radially outboard from the first race and the second race.

13. The switchable one-way clutch of claim 7, wherein the actuator arm extends radially inward toward the first race.

14. A switchable one-way clutch comprising:

an outer race including an outer surface, and an inner surface with a plurality of ramped surface features;

an inner race;

a roller cage assembly having a plurality of rollers between the inner race and the ramped surface features of the outer race to selectively enable torque to transmit when rotating in a first rotational direction and not transmit when rotating in a second rotational direction;

a control plate coupled to the roller cage assembly;

a first piston and a second piston, both pistons selectively moveable via hydraulic fluid; and an actuator arm extending between the first and second pistons and axially moveable via the pistons, wherein movement of the pistons in a first axial direction rotationally locks the roller cage assembly to inhibit rotational movement of the outer race, and movement of the pistons in a second axial direction rotationally unlocks the roller cage to enable rotational movement of the outer race.

15. The switchable one-way clutch of claim 14, wherein movement of the first piston in the first axial direction presses the actuator arm against the control plate to hold the control plate and roller cage assembly against rotation.

16. The switchable one-way clutch of claim 15, wherein movement of the first piston in the second axial direction enables the control plate and roller cage assembly to rotate in at least one direction.

17. The switchable one-way clutch of claim 14, further comprising an actuator assembly that includes the pistons, a hydraulic fluid chamber, and an actuator arm contacting and extending radially inward from the pistons, wherein pressurized hydraulic fluid entering the hydraulic fluid chamber moves the pistons and actuator arm in the first axial direction.

* * * * *